Patented Oct. 9, 1945

2,386,719

UNITED STATES PATENT OFFICE 2,386,719

METHODS OF TREATING PHENOL ETHERS AND PRODUCTS PRODUCED THEREBY

William F. Schaufelberger, Irvington, N. J., assignor, by mesne assignments, to The Harvel Corporation, a corporation of New Jersey No Drawing. Application October 21, 1942, Serial No. 462,840

14 Claims. (Cl. 260—23)

This invention relates to novel products as well as to the methods for preparing the same. In one of its aspects the invention is directed to a novel method of treating liquid ethers of phenols having unsaturated hydrocarbon substituents and to the resulting products. The unsaturation of said substituents consists solely of one or more ethylenic linkages. The ethers which are preferably employed are the alkyl ethers and those which find especial application herein are the primary and secondary alkyl ethers of phenols which have on their aryl nuclei unsaturated hydrocarbon substituents of from 14 to 28 carbon atoms in which the unsaturation is due solely to one or more ethylenic linkages. These ethers may be the ether derivatives of the liquid derived from the Anacardiaceae family of plants, such as of cashew nut shell liquid, japanese lac, marking nut shell liquid, etc., as well as of constituents and derivatives thereof such as cardanol, anacardic acid, cardol, anacardol, urushiol, etc., and of other phenols which have on their aryl nuclei unsaturated hydrocarbon substituents of from 14 to 28 carbon atoms and in which the unsaturation is due solely to one or more ethylenic linkages. The alkyl radicle of said ethers may be the methyl, ethyl, propyl, isopropyl, butyl, isobutyl, secondary butyl, amyl, isoamyl, secondary amyl, etc. radicles.

Prior to this invention, it was known that the aforesaid ethers were stable and non-drying oils which could be converted to drying oils by heating in air.

As distinguished from the prior art, my invention broadly is directed to heating the aforesaid ethers in the substantial absence of air until the ethers are thickened or bodied. The aforesaid ethers when so treated are novel compositions which, when spread as a coating, film or impregnating material, are capable of drying in the air or being dried by heating. The dry film, coating or impregnating composition is superior to the dry film of these ethers which were thickened or bodied in air. Their superiority is evidenced by the low power factor loss characteristic which they have and which makes the ethers, bodied or thickened in the absence of air excellent insulating material. Because of this characteristic, these products find a specific application as an insulating material which may be applied directly to an electrical conductor or as a coating or impregnating material on a base to be employed as an electrical insulating means.

Besides having a superior lower power factor loss characteristic, the ethers modified according to this invention, provide flexible films and coatings, which retain this flexibility characteristic over a comparatively long period of time.

In the practice of the invention, I prefer to thicken or body the aforesaid ethers by heating them in the absence of air, with the heating being carried out at elevated temperatures and preferably between about 300° F. and 650° F. The temperature employed is preferably below the temperature of incipient decomposition of the material treated as well as below that at which appreciable volatilization occurs. Of course the length of heating is proportional to the temperature employed.

In the treatment of the ethyl ethers of cashew nut shell liquid and of cardanol, for example, they may be heated in the substantial absence of air for 6 to 8 hours at about 600° F. to thicken or body the same. If a temperature of about 400° F. is employed under the same conditions, a period of three to four days would be required to thicken or body these ethers. The ethers may be heated at said temperatures in a closed vessel and a non-oxidizing gas such as nitrogen, carbon dioxide or the like may be slowly bubbled through said ethers in the course of heating. This gas displaces substantially all of the air which was originally present. This specific disclosure as to said ethers of cashew nut shell liquid and of cardanol are given by way of example and not by way of limitation because said methods of treating are applicable equally to the other alkyl ethers of phenols having unsaturated hydrocarbon substituents of from 14 to 28 carbon atoms and wherein the unsaturation is due solely to one or more ethylenic linkages.

Besides having the characteristics hereinbefore set forth, the ethers treated in accordance with the present invention impart these characteristics to other material with which they may be blended, mixed or combined.

While said ethers which are thickened or bodied by heat treatment in the substantial absence of air may be employed alone either as insulation, coating or impregnating material, they may be employed as constituents of various compositions, such as insulation materials, varnishes, coating and impregnating compositions, examples of which are hereinafter set forth in Examples 1–3.

The invention in one of its more specific aspects relates to flexible diaphragms for pumps for petroleum oils, particularly for gasoline and other petroleum oils which have a comparatively high solvent characteristic with respect to drying oil varnishes and other flexible, organic coating materials; and in this aspect the present invention relates more particularly to diaphragms for gasoline pumps in which the diaphragms are made up of one or more layers of a flexible material which has on the exposed surfaces thereof a flexible coating comprising one of the aforementioned ethers modified in accordance with the present invention.

A specific purpose of the present invention is to provide a pump diaphragm which is highly resistant to the solvent action of gasoline and which is sufficiently strong and flexible to withstand a great number of flexings, to withstand flexing at a high rate of speed and to withstand flexing throughout the wide range of temperature to which gasoline pump diaphragms are exposed in their use in automobiles which, as is well known, is as low as −40° F. at times in certain parts of the United States and temperatures of −20° F. are frequent over large areas and in the other extreme are as high as 120° F. in certain areas. It is also an object of the present invention to provide a flexible coated fuel pump diaphragm in which the coating will withstand the solvent action of the fuel at the temperatures to which it is subjected in use, and, as a factor of safety to take care of continued contact with said fuel, to withstand said solvent action at certain specified extreme temperatures for specified periods of time, as hereinafter stated.

Various flexible materials have been employed heretofore in coated, solvent resistant pump diaphragms, and here as examples for illustrating the present invention cotton textiles are cited. For particular examples the count of the fabric can be between 60 x 64 and 96 x 100, the tensile strength from 40 to 100 lbs. per inch width, and the material can be bleached or can be grey goods, singed or unsinged, sized or unsized, these characteristics being illustrative and not limiting. A particular cloth is cotton unsized, soft finish of 60 x 64 count; another is light balloon cloth, cotton, 80 square count, unsized, of about 40 lbs. tensile strength; and also heavy balloon cloth, cotton, unsized 80 square count, of about 70 lbs. tensile strength. The two balloon cloths are obtainable on the market. The present invention is not limited to textiles of any particular kind, the particularity of the examples being made merely for the purpose of facilitating the practice of the present invention in particular exemplifications thereof.

Examples of varnishes made of said ethers modified in accordance with the present invention and suitable for the practice of the present invention are as follows:

*Example 1.*—Eight parts by weight of amyl ether of cashew nut shell liquid, which ether was previously thickened or bodied by heat treatment in the absence of air, and one part of raw linseed oil are heated quickly up to about 600° F. and then removed from the fire and one part of raw linseed oil added to the mixture immediately upon removal. When the temperature has dropped to about 450° F. about one per cent each by weight of litharge and manganese resinate, calculated for the total weight of the cashew nut shell liquid and linseed oil, are added as driers. At about 300° F., solvents such as Varnoline (a petroleum between gasoline and kerosene) and petroleum naphtha are added. A film of this varnish will dry in about twenty minutes at about 275° F. and when dry has the characteristics of being flexible and resistant to solvents such as gasoline, kerosene, benzol, etc.

*Example 2.*—About 200 pounds each of isopropyl ether of cashew nut shell liquid, which ether was previously thickened or bodied by heat treatment in the absence of air, and about 200 pounds of China-wood oil are heated together to about 525° F. and held between this temperature and 500° F. for one-half hour to get a body, after which the batch is cooled to about 350° F. and 80 pounds of paraffin are added, after which the batch is allowed to cool to 300° F. at which point about 6 pounds of lead Soligen and 1½ pounds of manganese Soligen driers are added. This varnish batch is then thinned with about 50 gallons of Varsol. Varsol is a trade-mark name for a petroleum spirits used as a varnish thinner.

*Example 3.*—About 75 pounds of China-wood oil and 25 pounds of methyl ether of cardanol, which ether was previously thickened or bodied by heating the same in the absence of air, are heated up to about 300° F. and then allowed to cool to 250° F. at which point 100 pounds of toluol and 5 pounds of hexamethylene tetramine are added. This solution is refluxed under a condenser for about 12 hours at 240° F. to produce a desired body. Cardanol is a phenol having an unsaturated hydrocarbon side chain and has a boiling point of 225° C. at about 10 mm. of mercury. Cardanol is obtained by the distillation of cashew nut shell liquid with steam or at reduced pressure at about 270° C. This varnish batch is thinned with petroleum solvent (petroleum naphtha) to about fifty per cent solids. Cardanol and the method of making are described in Patent No. 2,098,824, issued November 9, 1937 to M. T. Harvey.

The fabric to be coated is run through a batch of one of the varnishes or coating materials of the above examples whereby both sides thereof are coated and the coating is set in place by heating, for example at about 275° F. for about 20 to 30 minutes. One or more of such coats may be successively applied.

In some cases there is applied over the last main coating an outer thin skin coating, a fraction of one-one thousandths of an inch in thickness, of a varnish which when dried is harder than the main coating or coatings, this being used in cases where the main coating has a degree of softness such as can occur even in varnishes which are resistant to the action of hydrocarbon solvents. This is used principally to prevent the main coating from sticking to itself when the coated fabric is wound into rolls for shipping or when layers thereof are piled up for the simultaneous punching out of a multiplicity of diaphragm blanks, in a manner well known in the art. The skin coating is so thin that it does not affect the flexibility of the diaphragm made up of the coated fabric on which it is used.

The above examples of varnishes and coatings are given merely for the purpose of illustrating the invention and the present invention is not limited to pump diaphragms coated therewith. Also, fabrics other than of cotton can be used, for example linen and silk.

Certain of the products of the present inventions as illustrated in the above examples, and particularly in Example 3, are made to meet certain specifications designed to measure the practicability of these products in use. These specifications include a test for imperviousness to hydrocarbon fuel after immersion of a laminated diaphragm therein for about two hours at the boiling point of said fuel. Another test which products of the present invention meet is that of being immersed in gasoline at 120° C. for about one hour to give less than ten per cent extraction of the coating which is in the fabric.

Examples of the skin-coat varnish are that of Example 2, but in which the amount of driers used is double that in the Example 2, also the varnish of Example 3 in which four per cent of the weight of the cardanol and the China-wood oil is added in manganese "Soligen" driers. In laying down the skin coat the solvent is increased to bring the solids to about 30% to 35%. Another example is made by heating about one hundred pounds of ester gum and about twenty-five pounds of drying oil (linseed oil and Chinawood oil, for example) to about 550° F. after which are added about two per cent each of lead "Soligen" and manganese "Soligen" driers at about 400° F. and the varnish cut to about thirty per cent solids with petroleum solvent.

The materials and diaphragms of the present invention are suitable for use in pumps of the kind illustrated and described in United States Patent No. 1,695,534 to W. C. Carter, whether cam, magnetically or otherwise operated, and are particularly suited for use in fuel pumps of automobiles.

Also, in any of the above examples, for any of the drying oils used there can be substituted, in whole or in part, perilla oil, rape seed oil, cottonseed oil, fish oil or other oils which can be dried with the common driers such as manganese resinate, copper oleate or Soligen driers, for example.

The present application is a continuation in part of my copending application Ser. No. 293,204, filed September 2, 1939 and through that of my application Ser. No. 130,100, filed March 10, 1937.

I claim:

1. The method for modifying a liquid alkyl ether of a phenol having on its aryl nucleus an unsaturated hydrocarbon substituent of 14 to 28 carbon atoms and whose unsaturation is due solely to ethylenic linkage said alkyl ether having 1 to 5 carbon atoms in the alkyl group, comprising heating said ether in the substantial absence of oxygen until said ether is thickened.

2. The method for modifying a liquid alkyl ether of cardanol said alkyl ether having 1 to 5 carbon atoms in the alkyl group, comprising heating said ether in the substantial absence of oxygen until said ether is thickened.

3. The method for producing a composition capable of providing a substantially dry flexible film, comprising heating a mixture comprising a drying oil and a bodied product obtained by heating in the substantial absence of oxygen a liquid alkyl ether of a phenol having on its aryl nucleus an unsaturated hydrocarbon substituent of 14 to 28 carbon atoms and whose unsaturation is due solely to ethylenic linkage, said alkyl ether having 1 to 5 carbon atoms in the alkyl group.

4. The method for producing a composition capable of providing a substantially dry flexible film, comprising heating a mixture comprising a drying oil and a bodied product obtained by heating in the substantial absence of oxygen a liquid alkyl ether of cardanol, said alkyl ether having 1 to 5 carbon atoms in the alkyl group.

5. A composition of matter, capable of producing a substantially dry flexible film, comprising the bodied product obtained by heating in the substantial absence of oxygen a liquid alkyl ether of a phenol having on its aryl nucleus an unsaturated hydrocarbon substituent of 14 to 28 carbon atoms and whose unsaturation is due solely to ethylenic linkage, said alkyl ether having 1 to 5 carbon atoms in the alkyl group.

6. A composition of matter, capable of producing a substantially dry flexible film, comprising the bodied product obtained by heating in the substantial absence of oxygen a liquid alkyl ether of cardanol, said alkyl ether having 1 to 5 carbon atoms in the alkyl group.

7. A base coated with a composition comprising a substantially dry material obtained by drying a composition obtained by heating in the substantial absence of oxygen, a liquid alkyl ether of a phenol having on its aryl nucleus an unsaturated hydrocarbon substituent of 14 to 28 carbon atoms and whose unsaturation is due solely to ethylenic linkage, said alkyl ether having 1 to 5 carbon atoms in the alkyl group.

8. A base coated with a composition comprising a substantially dry material obtained by substantially drying a composition obtained by heating a mixture comprising a drying oil and a bodied product obtained by heating in the substantial absence of oxygen, a liquid alkyl ether of a phenol having on its aryl nucleus an unsaturated hydrocarbon substituent of 14 to 28 carbon atoms and whose unsaturation is due solely to ethylenic linkage, said alkyl ether having 1 to 5 carbon atoms in the alkyl group.

9. An electrical insulator comprising a base coated with a composition comprising a composition produced by drying the product obtained by heating a mixture comprising a drying oil and a bodied material obtained by heating in the substantial absence of oxygen a liquid alkyl ether of a phenol having on its aryl nucleus an unsaturated hydrocarbon substituent of 14 to 28 carbon atoms and whose unsaturation is due solely to ethylenic linkage, said alkyl ether having 1 to 5 carbon atoms in the alkyl group.

10. An electrical insulator comprising a base coated with a composition comprising a composition produced by drying the product obtained by heating a mixture comprising a drying oil and a bodied material obtained by heating in the substantial absence of oxygen a liquid alkyl ether of cardanol, said alkyl ether having 1 to 5 carbon atoms in the alkyl group.

11. The method for modifying a liquid alkyl ether of cashew nut shell liquid, said alkyl ether having 1 to 5 carbon atoms in the alkyl group, comprising heating said ether in the substantial absence of oxygen until said ether is thickened.

12. The method for producing a composition capable of providing a substantially dry flexible film, comprising heating a mixture comprising a drying oil and a bodied product obtained by heating in the substantial absence of oxygen a liquid alkyl ether of cashew nut shell liquid, said alkyl ether having 1 to 5 carbon atoms in the alkyl group.

13. A composition of matter, capable of producing a substantially dry flexible film, comprising the bodied product obtained by heating in the substantial absence of oxygen a liquid alkyl ether of cashew nut shell liquid, said alkyl ether having 1 to 5 carbon atoms in the alkyl group.

14. An electrical insulator comprising a base coated with a composition comprising a composition produced by drying the product obtained by heating a mixture comprising a drying oil and a bodied material obtained by heating in the substantial absence of oxygen a liquid alkyl ether of cashew nut shell liquid, said alkyl ether having 1 to 5 carbon atoms in the alkyl group.

WILLIAM F. SCHAUFELBERGER.